R. P. BROWN.
METHOD OF AND APPARATUS FOR DETERMINING TRANSFORMATION POINTS.
APPLICATION FILED JAN. 7, 1916.
1,189,785. Patented July 4, 1916.
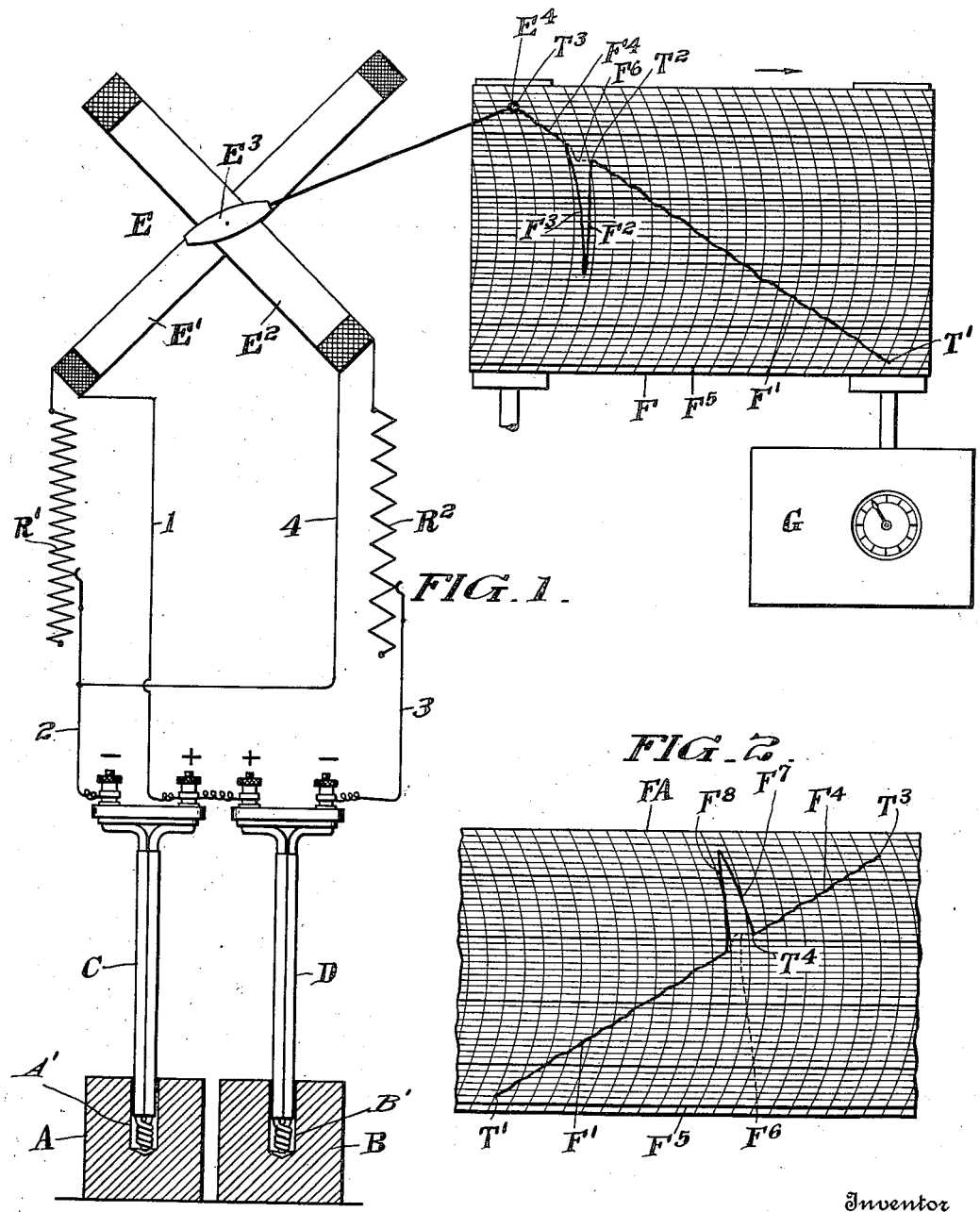

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

METHOD OF AND APPARATUS FOR DETERMINING TRANSFORMATION-POINTS.

1,189,785.    Specification of Letters Patent.    Patented July 4, 1916.

Application filed January 7, 1916. Serial No. 70,737.

*To all whom it may concern:*

Be it known that I, RICHARD P. BROWN, a citizen of the United States of America, and resident of Philadelphia, county of Philadelphia, and State of Pennsylvania, have invented certain new and useful Improvements in Methods of and Apparatus for Determining Transformation-Points, of which the following is a true and exact description, reference being had to the accompanying drawings, which form a part thereof.

The object of my present invention is to provide an improved method of, and apparatus for determining so called "transformation points"; *i. e.* the temperature points at which objects or bodies of material, absorb or give up heat without appreciable changes in temperature. The accurate determination of transformation points is of much practical importance. For example, in the heat treatment of steels the transformation points known as the points of "recalescence" and "decalescence" which vary with the composition of the steel are employed to fix, or form a means for determining the best temperatures for annealing and hardening.

In determining a transformation point in accordance with the present invention, I employ a specimen, or test body, of the material to be tested, and a similar shaped specimen, or neutral body, of material having no transformation point, at least within the measured temperature range through which the test body is to be carried in locating the sought for transformation point. I simultaneously subject the test and neutral bodies to the same thermal conditions tending to progressively vary their temperatures through the desired range while associating with each body an electrical device which is subjected to the varying temperature of the body, and will exert a current regulating effect responsive to said temperature.

In the preferred practical mode of utilizing my invention, the two electrical devices employed are thermo-electric couples each of which has its hot joint inserted in a cavity formed for the purpose in the corresponding body.

If the test and neutral bodies with their associated electrical devices have the same heat absorbing properties, as should be the case, the absolute temperatures of the two bodies will vary at the same rate when subjected to the same thermal conditions, and the two bodies will not differ in temperature from one another until the transformation temperature of the test body is reached. The temperature of the test body remains practically constant during the transformation stage, while the temperature of the neutral body will continue to vary. After the physical change in the test body, marking its passage through the transformation stage is completed, the temperature of the test body quickly approaches equality again with that of the neutral body.

The electrical device which I associate with each body creates or establishes an electro-motive force, or potential difference, which is a function of, and forms a measure of the temperature of the body, and the gist of my invention consists in the novel mode of, and means for utilizing these potential differences to determine the transformation point of the test body which I have devised. In making this determination I employ an electrical measuring instrument, ordinarily a sensitive recording volt meter, which is of the differential type in that it comprises two windings and a movable element so arranged that a current flow through either winding will cause a corresponding deflecting force to act upon the movable element. I connect the electrical device, responsive to the temperature of the test body, in circuit with one winding of the electrical measuring instrument, and when the action of the instrument is not modified by a current flow through its second winding, the instrument thus serves to indicate the temperature of the test body. I also connect the two thermally responsive electrical devices in series with one another and with the second winding of the electrical measuring instrument in such manner that the electromotive force or potential difference of each electrical device opposes that generated in the other. In consequence, so long as the test body and the neutral body do not differ in temperature from one another, there is no current through the second winding of the electrical measuring instrument.

When the temperatures of the two bodies differ as they do when the test body reaches the transformation temperature and is then momentarily approximately constant while the temperature of the neutral body continues to change, there will be a current flow through the second winding of the instrument which will be a function of the difference between the temperatures of the two bodies, and will exert a deflective force on the movable element of the instrument. This second deflective force will rise to a maximum and then decrease again to zero during the comparatively short period, ordinarily of a couple of minutes or so, required for the test body to pass through the transformation point and again come to an equality in temperature with the neutral body. The instrument should be so arranged that the change in the deflective force exerted for a given change in the effective electromotive force or potential difference in the circuit including the second winding is much greater than that resulting from the same variation in the circuit including the first winding. This insures a deflection, due to the second winding, as the test body passes through the transformation point, ample for observation purposes, and which will show in the case of a recording instrument as a sharp high "peak" in the record curve.

While I have spoken of the electrical measuring instrument as of the differential type, it is in general immaterial whether the deflective force exerted on the movable element of the instrument by the second coil is in the same direction as the force exerted by the first mentioned coil or in the opposite direction.

By proceeding in the manner described the sensibility of the first winding of the instrument may be sufficiently low, and its "range" sufficiently high to show the temperature range of the test body on a convenient scale, while the transformation point is shown on the same record with satisfactory certainty and sharpness due to the much greater sensitiveness or lower "range" of the second winding. It is thus possible to obtain results with a single measuring instrument which heretofore have only been obtained or approximated in practice by the use of two separate instruments of different sensibilities or ranges connected as I have connected the two windings of my single instrument. The use of a single instrument is advantageous not only because it halves the instruments required, but also because it obviates the necessity for simultaneous readings or a comparison or matching up of records which the use of two separate instruments entails.

In the accompanying drawings: Figure 1 is a diagrammatic representation of the apparatus which I have devised for carrying out my invention; and Fig. 2 is a view of a record taken with the instrument shown in Fig. 1.

In the drawings, A represents the test body, and B the neutral body which is similar in shape and size to the test body, and preferably should be of a material having approximately the same rate of heat absorption as the test body, at least at temperatures in the neighborhood of the transformation point of the test body to be determined. For example, if the test body is a carbon steel, the neutral body is advantageously of a soft steel free from transformation points. In the similar cavities A' and B' formed for the purpose in the test and neutral bodies A and B respectively, are inserted the hot joints of similar thermo-couples C and D. These thermo-couples should preferably be of the same material, weight and shape so as to have identical heat absorptive, as well as thermo-electric properties.

The terminals of the thermo-couple C are connected by conductors 1 and 2 to the two terminals of the coil E' of a suitable electric recording instrument of the differential type. As diagrammatically shown, the instrument E is a galvanometer comprising two coils E' and $E^2$ at right angles to one another, and a movable magnet element $E^3$ pivoted to turn about an axis coincident with a diameter of each coil. Those skilled in the art will understand, however, that other types of electrical measuring instruments may be employed in lieu of the conveniently illustrated type shown by the drawing. One terminal, as shown, the positive terminal, of the couple D is connected to the similar terminal of the couple C, while the negative terminal of the couple D is connected by the conductor 3 to one terminal of the coil $E^2$. The second terminal of the coil $E^2$ is connected by a conductor 4 to the conductor 2. The conductor 2 includes between its junctions with the conductor 4 and the coil E', a suitable regulating resistance R', and a regulating resistance $R^2$ is placed in the conductor 3. As shown, the movable element $E^3$ of the instrument E carries a marking device $E^4$ which traces a record on the record sheet F which is slowly fed in the direction of the arrow by the clock mechanism G.

With the arrangement shown the coil E' will exert a deflective force on the element $E^3$ which will vary progressively with the temperature of the test body as the latter is heated or cooled to carry it through the transformation point. So long as the two bodies A and B do not differ in temperature from one another there will be no current flow through the coil $E^2$, but when the variation in the temperature of the test body is momentarily arrested at the transformation point while the temperature of the neutral body continues to change, the thermo-electro-motive force of the couple in contact with the hotter of the two bodies will exceed that of the other thermo-couple, and a current flow through the coil $E^2$ of the instrument E will then occur. The coils $E'$ and $E^2$ and their circuit connections are advantageously so arranged that the coil $E^2$ will exert a torque on the movable element $E^3$ much greater per unit of effective thermo-electro-motive force in the circuit including the coil, than will the coil $E'$. This result may be accomplished by providing more turns in the coil $E^2$ than in the coil $E'$, by making the resistance in the circuit including the coil $E^2$ smaller than the resistance in the circuit including the coil $E'$, or in both ways.

In Fig. 1, $F'$, $F^2$, $F^3$ and $F^4$ represent the different sections of a curve traced by the instrument E when the test and neutral bodies A and B are placed in a furnace to vary the temperature of the test body through a temperature range including a temperature $T'$ well below the decalescence point $T^2$ of the steel, to a temperature $T^3$ above the decalescence point. The sections $F'$ and $F^4$ of the curve are drawn when the only deflecting force acting on the movable meter element $E^3$ is that due to the coil $E'$. In consequence, the temperature at any point along these curve sections is a function of the distance of the point from the base line $F^5$ and the apparatus operates like an ordinary recording pyrometer to measure the temperature variations of the test body while those sections of the curve are being drawn. The section $F^2$ of the curve is drawn while the temperature of the neutral body rises above that of the test body which remains approximately constant for some seconds or minutes at the transformation temperature. The section $F^3$ is drawn while the temperature of the test body is building up to equality with the temperature of the neutral body after the test body passes through the transformation temperature. The distance of a point on the curve sections $F^2$ and $F^3$ from the base line $F^5$ is not intended to give a definite quantitative temperature indication, but these sections of the curve do indicate with all desirable sharpness and precision the location of the transformation point. Actually the sections $F^2$ and $F^3$ do indicate with approximate exactness the maximum difference in temperature between the neutral and test bodies as the latter body passes through the transformation point, but the scale on which this temperature differential is indicated is very much larger than that on which the temperature indications of the curve sections $F'$ and $F^4$ are shown.

If the coil $E^2$ were not used, the curve sections $F'$ and $F^4$ would be connected by a section the character of which is indicated by the dotted line $F^6$ in Fig. 1. While theoretically such a curve section $F^6$ should deviate from the general direction of the adjacent ends of the curve sections $F'$ and $F^4$ and thereby indicate the transformation point, in practice the jog thus produced is not readily discernible in many cases, when the curve is traced by an instrument of otherwise suitably high range, and under the conditions of use it is practically impossible in many cases, to locate the transformation point with any certainty from such a curve deviation. This means, in effect, that so far as the general temperature curve formed by the sections $F'$, $F^6$ and $F^4$ is concerned, there is on the scale of this curve, ordinarily at no time any substantial difference in temperature between the test and neutral bodies, and in practice it is immaterial whether the winding $E'$ is connected to the terminals of the couple C or to the terminals of the couple D.

In Fig. 2 I have illustrated a record FA such as would be drawn with the apparatus shown in Fig. 1 as the temperature of the test and neutral bodies are carried from the upper temperature $T^3$ through the recalescence point $T^4$, back to the starting temperature $T'$. The recalescence temperature is ordinarily considerably lower than the decalescence temperature as is indicated by the drawings, and the "peak" formed by the curve sections $F^7$ and $F^8$ of Fig. 2, drawn while the test body is passing through the recalescence stage will lie on the opposite side of the temperature curve from the curve sections $F^2$ and $F^3$ as shown, if the circuit connections are not changed. This is due to the fact that the direction of current flow through the coil $E^2$ will be in one direction when the neutral body is hotter than the test body, as it was when the curve sections $F^2$ and $F^3$ were drawn, and will be in the opposite direction when the neutral body is the colder as it is when the curve sections $F^7$ and $F^8$ are drawn. In drawing the curve shown in Fig. 1, the deflective forces exerted on the movable meter element $E^3$ by the coils $E'$ and $E^2$ oppose one another while in forming the curve section $F^7$ and $F^8$, the two deflective forces act in the same direction with respect to their effects on the deflection of element $E^3$.

While in accordance with the provisions of the statutes I have disclosed the best form of my invention now known to me, it will be apparent to those skilled in the art that changes may be made in the described mode of operation and in the form of the apparatus conventionally illustrated without departing from the spirit of the invention set forth in the annexed claims.

Having now described my invention, what I claim as new and desire to secure by Letters Patent, is:

1. The method of determining the transformation temperature of a test body which consists in simultaneously subjecting said test body and a neutral body to the same thermal conditions to vary their temperatures through a range including the transformation point, utilizing the varying temperatures of the two bodies to maintain an electropotential difference which is a function of the temperature of the test body and a second electropotential difference which is a function of the differences between the temperatures of the two bodies and subjecting the movable element of an electric measuring instrument to a deflecting force due to the first of said potential differences and simultaneously therewith to a second force due to the second of said potential differences.

2. The method of determining the transformation temperature of a test body which consists in simultaneously subjecting said body and a neutral body to the same thermal conditions to vary their temperatures through a range including the transformation point, subjecting a thermo-couple to the varying temperature of the test body, subjecting the movable element of a temperature measuring device to a deflecting force which is a function of the potential difference generated in said thermo-couple, subjecting a second thermo-couple to the varying temperature of the neutral body, and simultaneously therewith subjecting said movable element to a deflecting force which is a function of the difference between the potential differences created in the two thermo-couples on a variation between the temperatures of the test and neutral bodies.

3. Apparatus for determining the transformation point of a test body from the temperatures of the test body and a neutral body subjected to the same thermal conditions to vary their temperatures through a range including the transformation point, which comprises in combination with said bodies, an electrical measuring instrument of the differential type having two windings and a movable element subjected to a deflecting force by a current flow of either winding, and means responsive to the temperatures of said bodies for impressing an electro-motive force on the terminals of one of said windings which is a function of the temperature of the test body, and for impressing on the terminals of the other of said windings an electro-motive force which is a function of the difference between the temperatures of the test and neutral bodies.

4. Apparatus for determining the transformation point of a test body from the temperatures of the test body and a neutral body subjected to the same thermal conditions to vary their temperatures through a range including the transformation point, which comprises in combination, a thermo-couple subjected to the temperature of the test body, a second thermo-couple subjected to the temperature of the neutral body, an electrical measuring instrument of the differential type having two windings and a movable element subjected to a deflecting force by a current flow in either winding, and circuit connections for connecting the terminals of one of said thermo-couples to the terminals of one of said windings, and for connecting the two thermo-couples in series with the other winding and in such relation that each thermo-couple bucks the other.

RICHARD P. BROWN.